Jan. 5, 1937.  C. G. MUNTERS  2,067,015
INSULATION
Filed Dec. 5, 1934
Fig.1.
Fig.2.
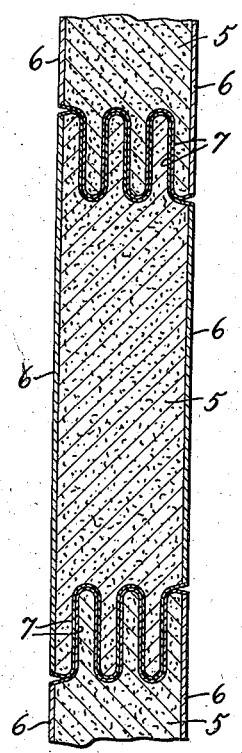
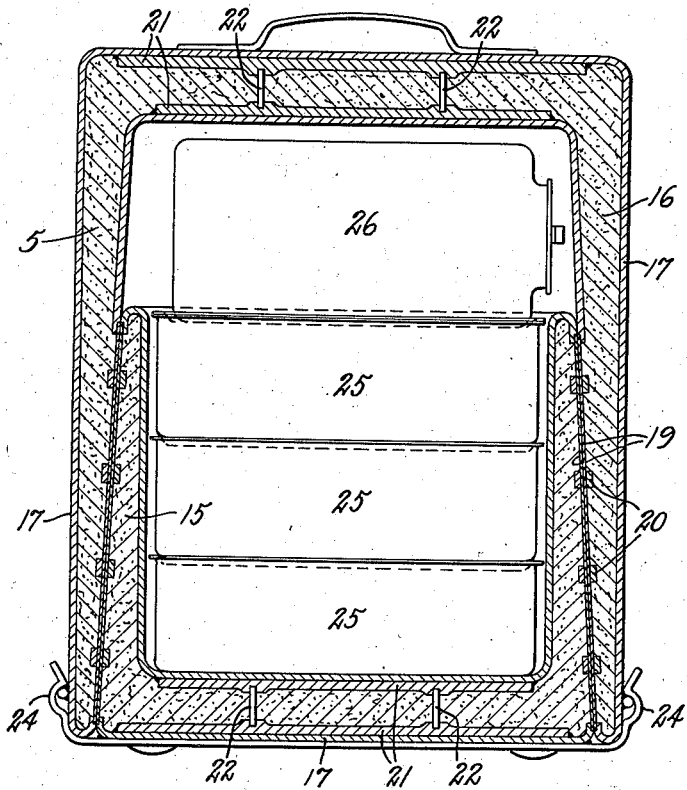
INVENTOR,
Carl Georg Munters
BY
his ATTORNEY.

Patented Jan. 5, 1937

2,067,015

UNITED STATES PATENT OFFICE 2,067,015

INSULATION

Carl Georg Munters, Stockholm, Sweden, assignor to Aktiebolaget Termisk Isolation, Stockholm, Sweden, a corporation of Sweden Application December 5, 1934, Serial No. 756,051
In Sweden March 3, 1931

9 Claims. (Cl. 154—44)

This application is a continuation in part of my copending application Serial No. 595,411 filed Feb. 26, 1932, and is to be considered as relating back to said application for common subject matter and the rights incident thereto, including the rights incident to filing a corresponding application in Sweden on March 3, 1931.

The invention relates to insulation and the object is to provide an insulation having better heat transmission negation than that of stagnant air and other ordinary insulations. The nature of the invention will become apparent from consideration of the following description taken in conjunction with the accompanying drawing forming part of this specification, and of which:

Fig. 1 is a transverse sectional view of insulation embodying the invention; and Fig. 2 is a sectional view of a receptacle insulated in accordance with the invention.

The insulation wall 5 shown in Fig. 1 is made of an outer wall structure which is hermetically sealed and is filled with a powder, granulated material, a fibrous mass or the like. There is also sealed within the wall structure a gas having poor heat transmitting ability, for example, a compound including sulphur and/or a halogen, such as dichloro-difluoromethane or sulphur hexafluoride. The solid material within the insulation wall serves both to counteract heat transmission by radiation and heat transmission by convection of the gas contained therein. As a filler, powdered glass, siliceous earth, glass-wool, powdered charcoal, granulated cork, or cork powder may be used.

The walls 6 which are transverse to the direction of flow of heat are made of metal. The walls 7 which extend in the direction of flow of heat should be made of material of poor heat transmitting ability and for this purpose cellon (a mixture of acetocellulose and camphor or like plasticizers) or a metal alloy such as nickel-steel may be used. A nickel alloy comprising 30 to 40 per cent nickel has proven to be satisfactory. Obviously all of the walls 6 and 7 may be made of a nickel-iron alloy. I preferably make the walls 7 which extend in the direction of heat flow of extended length as shown in Fig. 1 in order to diminish the heat flow. It might be mentioned that sulphur hexafluoride has a heat transmitting capacity which is only a third or a fourth of that of stagnant air. Furthermore this gas is chemically inert to the other substances mentioned and has a low diffusion capacity which makes it relatively easy to hold this gas within the walls of the insulation. This is especially true if the walls be made in whole or in part of cellon. The gas may be charged into the casing structure so as to have a pressure at or somewhat below atmospheric pressure. When the gas has a pressure below atmospheric, the filler prevents the walls from collapsing.

In Fig. 2 I have shown the application of the insulation to a container. The container, which may be used for storing food, and which constitutes in effect a fireless cooker, is composed of a lower part 15 and an upper part 16, the upper part serving as a lid or cover for the lower part. Both parts are provided with walls 17 which may be of metal. These walls may be enameled. The wall parts 19, where the two parts of the container meet, and which constitute heat conducting paths between the outer and inner walls of the respective container parts, are preferably made of a material of low heat conducting capacity. For this purpose a nickel-steel alloy may be used. Also these wall parts 19 are made very thin. In order to support them against buckling due to the internal partial vacuum, in addition to the porous mass 5 contained within the wall structure hoops or rings 20 may be provided constituting stiffening members for the wall parts 19. These walls are made conical to facilitate closing the container.

The horizontal walls, namely, the upper and lower walls, may be reinforced as by parallel plates 21 which can be held spaced by pins or the like 22. The two parts of the container may be held together by cleats or the like 24. The parts are hermetically sealed as described in connection with Fig. 1 and contain a powdered or fibrous material, for example, glass, carbon, ground cork or the like and the interior is filled with gas of poor heat conducting ability. Vessels 25 for food may be placed within the container, and 26 designates a bottle.

Besides sulfur hexafluoride ($SF_6$) the dichloro-difluoromethane ($CCl_2F_2$), other gases which may be used within the insulation are methyl chloride ($CH_3Cl$), sulfuryl fluoride ($SO_2F_2$), methyl bromide ($CH_3Br$), and ethyl iodide ($C_2H_5I$). All these gases are halogen compounds. Other suitable gases for certain insulations are compounds of sulphur such as sulphur dioxide ($SO_2$) and carbon disulphide ($CS_2$). A mixture of two or more of said gases may be used. The gas or gas mixture which is made use of should have a boiling point lower than the lowest temperature prevailing where the heat insulator is to be used. The gas chosen should be insoluble in the material of which the insulation is made and should not react with said material. Each of the substances mentioned has a lower heat conductivity than air at a corresponding temperature and pressure.

Only a total internal pressure of about 0.1 mm. Hg need be produced for obtaining about the same insulation effect as present in a thermos bottle.

What I claim is:

1. Heat insulation comprising a hermetically closed element which contains a gas having a lower heat conductivity than that of air at corresponding pressure and means counteracting heat transfer due to convection and radiation, the outer and inner members of the element being made of metal and the transverse walls connecting said members being of poor heat conducting material and having a length greater than the shortest distance between the members they connect.

2. A hermetically sealed insulating element having opposite walls connected by corrugated walls of low heat conductivity and a gas of low heat conductivity confined within said insulating element.

3. Heat insulation including walls extending transversely to the direction of heat flow and walls extending in the direction of heat flow, said walls being of metal and at least the second-mentioned walls being of metal of poor heat conductivity, the walls being secured together to form a hermetically sealed casing, and a solid finely divided material in said casing of a character to resist compression, said casing being filled with said material and being at less than atmospheric pressure inside the same whereby said material prevents the walls from collapsing, said material constituting the only staying means within the casing between opposite walls thereof.

4. Heat insulation including walls extending transversely to the direction of heat flow and walls extending in the direction of heat flow, said walls being of metal and at least the second-mentioned walls being of metal of poor heat conductivity, the walls being secured together to form a hermetically sealed casing, and a solid finely divided material in said casing of the character of powdered charcoal or siliceous earth, said casing being filled with said material and being at less than atmospheric pressure inside the same whereby said material prevents the walls from collapsing, said material constituting the only staying means within the casing between opposite walls thereof.

5. Heat insulation comprising a hermetically closed element which is interiorly under sub-atmospheric pressure and contains a filler, the outer and inner members of the element being made of metal and the walls connecting said members being of poor heat conducting material and having a length greater than the shortest distance between the members they connect, said filler staying the walls of the element against collapse.

6. An insulation member including spaced walls extending transverse to the direction of heat flow and connecting walls in the direction of heat flow, said walls being connected to form a hermetically sealed casing, one or more of said walls being such that the casing is collapsible on preponderance of external pressure, said casing having a pressure below atmospheric within the same, and a finely divided filler within said casing for hindering flow of heat and preventing the casing from collapsing.

7. An insulation member including spaced metal walls extending transverse to the direction of heat flow and metal walls extending in the direction of heat flow, said walls being connected to form a hermetically sealed casing, said last-mentioned walls being longer than the normal distance between the first-mentioned walls and of such construction that the casing is not self-supporting under preponderance of external pressure, the interior of said casing being under subatmospheric pressure, and a finely divided filler in said casing for hindering heat flow and preventing the walls from collapsing.

8. A hermetically sealed insulating element having opposite walls connected by corrugated walls of low heat conductivity, the interior of said element being under subatmospheric pressure, and a filler in said element for staying the walls against preponderance of external pressure.

9. An insulation member as set forth in claim 6 including at least one connecting wall of thin nonconducting material and of appreciable width, and means for staying said connecting wall.

CARL GEORG MUNTERS.